United States Patent Office 2,777,865
Patented Jan. 15, 1957

2,777,865

OXIDATION OF FATTY ACIDS

Roger L. Logan, Elkins Park, Pa., assignor to Kessler Chemical Co., Inc., Philadelphia, Pa., a corporation of Pennsylvania No Drawing. Application January 12, 1953, Serial No. 330,924

7 Claims. (Cl. 260—413)

This invention relates to the conversion of saturated and unsaturated monohydroxy fatty acids into the corresponding dibasic and monobasic acids.

It has long been known, for example, that when ricinoleic acid is subjected to the action of caustic there will be produced capryl alcohol and sebacic acid. However, I have found that by the method of this invention the objectionable capryl alcohol can be eliminated and that in its place heptanoic acid can be produced.

A further and surprising result is that I can cause scission of the saturated monohydroxy stearic acids. This is entirely unexpected since it has never been known to cause scission with caustic of a saturated monohydroxy acid.

I have found, for example, that pure sebacic acid, pure undecylenic acid and pure heptanoic acid can be produced from ricinoleic acid. I have also found, by way of further example, that pure undecanoic dicarboxylic acid and pure heptanoic acid can be produced from 12 hydroxy stearic acid.

The method in accordance with this invention comprises broadly the reaction of a monohydroxy fatty acid with fused caustic at temperatures above the melting point of the caustic. The monohydroxy fatty acid is preferably added slowly to the caustic which has been preheated to the desired temperature.

I have found also that I can use in place of the monohydroxy acids, compounds which will yield hydroxyl groups to form monohydroxy acids on addition to caustic, such as the monohalogen fatty acid compounds or sulfonated or sulfated compounds which on addition to caustic at elevated temperatures produce hydroxy compounds, which in turn enter the aforementioned process.

The reaction may be carried out in any standard reaction vessel which is equipped with an agitator and capable of withstanding temperatures in the range of 310 to 450° C.

More specifically, dry caustic is melted and the temperature is maintained between the melting point of the dry caustic and a temperature just below that at which the products decompose, about 475° C. The selected monohydroxy acid is then added continuously in small portions. The reaction is usually complete as soon as all the monohydroxy acid has been added. At high temperatures of above about 300° C., it is necessary to exclude oxygen, which can be accomplished by providing an inert atmosphere free of oxygen, such as, for example, $N_2$, $CO_2$ or steam. Sufficient steam is produced as the water of saponification if fatty acids are used as the charged material.

I have found that the higher the temperature up to 475° C. the more undecylenic and undecanoic acids are produced when ricinoleic acid and 12 hydroxy stearic acid are used, respectively, as starting materials.

At the completion of the reaction the thus formed alkali salts are cooled and slowly added to dilute mineral acid, such as hydrochloric or sulfuric acid. The pH is adjusted to about 5.5 to about 6.5. The oil layer is removed and the water layer is further acidulated to a pH in the range of about 1 to about 2. The water solution which has been adjusted to the desired pH is then cooled and on slight cooling the dibasic acids crystallize out. They may be then separated by filtration and washed with cold water to remove any salt which may have adhered to the crystals. The oil layer which was separated is fully acidulated to a pH in the range of about 2.0 to 1.0 and subjected to distillation, preferably vacuum distillation, to remove the monobasic acids formed. The thus formed monobasic acids are separated by fractional distillation.

It will be apparent that this reaction can be carried out in the presence of water at the specified temperatures if a kettle of strength adequate to withstand the developed pressure is used. It is practical to carry out the methods of this invention as a continuous operation.

The monohydroxy acid may be any monohydroxy aliphatic acid having from 11 to 22 carbon atoms, such as, for example, 12 hydroxy stearic acid, ricinoleic acid, 10 hydroxy undecanoic acid, 13 or 14 hydroxy behenic acid, or 9 or 10 hydroxy stearic acid or ricineladic acid.

It will be appreciated that all of the position isomers of the above mentioned compounds can be utilized as well as their functional derivatives, such as, for example, esters, amides and alkali metal salts, and the term "monohydroxy acid" used in the specification and claims is intended to include such compounds.

The term "monohydroxy acid" is also intended to include mono halo aliphatic acids, mono sulfonated aliphatic acids and mono sulfated aliphatic acids, all of said componds having from 11 to 22 carbon atoms, which may be readily transformed by the action of cuastic to monohydroxy aliphatic acids having from 11 to 22 carbon atoms or to functional derivatives of such acids. The following compounds are exemplary: 10 bromo stearic acid, 12 sulfo oleic acid, 10 sulfo stearic acid and the sulfate ester of ricinoleic acid.

The caustic may be derived from any of the alkali metals such as barium, lithium, calcium, sodium, or potassium. The hydroxides and oxides of such alkali metals may also be used. Due to their low cost, sodium or potassium are preferred.

The invention will be further clarified by reference to the following specific examples:

Example 1

75 parts of 12 hydroxy stearic acid, about 85% purity, were slowly charged to molten sodium hydroxide which had been preheated to 365° C. under an atmosphere of nitrogen. The mass was agitated during the addition. The addition time was one hour. When addition was complete, the reaction was immediately cooled, and the formed salts were acidulated with dilute hydrochloric acid. An oil layer separated. The oil layer was extracted with boiling water which contained a small amount of caustic. The water extractions were then acidulated to a pH of 2.

Upon slight cooling, a crystalline material formed. The crystalline material was filtered and found to be an excellent grade of nonane dicarboxylic acid

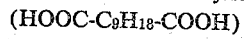
(HOOC-$C_9H_{18}$-COOH)

melting point 108° C. The oil layer which remained after extraction was subjected to vacuum distillation at 1 mm. absolute pressure and heptanoic acid readily distilled out at 85° C. On further heating to 120° C. undecanoic acid readily distilled out. The heptanoic acid was nearly pure, having an acid number of 421. The undecanoic acid has an acid number of 306.

Example 2

79 parts of ricinoleic acid, 85% purity, were slowly charged to 100 parts of molten sodium hydroxide which had been preheated to 340° C. under an atmosphere of nitrogen. The addition of ricinoleic acid was complete in three-quarters of an hour. The reaction was immediately cooled. The soaps were acidulated with a 25% aqueous sulfuric acid. Upon acidulation an oil layer separated from the water layer. The water layer was adjusted to a pH 2. The oil layer was removed from the water layer and vacuum distilled at 1 mm. absolute pressure. Heptanoic acid distilled at 85° C. (acid number 420). On further heating to 115° C. nearly pure undecylenic acid distilled out (acid number 307).

The water layer, upon cooling, crystallized and was filtered. The crystals recovered melted at 130° C. and were an excellent grade of sebacic acid. The residue from distillation of heptanoic acid contained large amounts of sebacic acid which was recovered by water extraction.

*Example 3*

500 parts of 13 chloro behenic acid, approximately 85% purity, were charged to 400 parts of molten KOH at 395° C. The addition time was one and one-half hours. After the addition was complete, the reaction was immediately cooled and the soaps recovered were acidulated with 25% aqueous sulfuric acid. An oil layer separated. The oil layer was made neutral with respect to mineral acid, and then vacuum distilled, to recover pelargonic acid.

The pelargonic acid had an acid number of 370, and was an excellent grade of pelargonic acid.

The residue from distillation was extracted with a plurality of portions of water containing small amounts of caustic. The extractions were combined and pH adjusted to 6. The solution was then acidulated with dilute aqueous sulfuric acid to a pH of 2. A crystalline dibasic acid separated while hot. The solutions were cooled and filtered to remove the dibasic acid. The dibasic acid had an acid number of 460 and was a good grade of brassylic acid which contained a small amount of azelaic acid.

*Example 4*

1000 parts of 10 hydroxy undecanoic acid were added to 900 parts of molten sodium hydroxide which had been preheated to 320° C.

The addition time was two hours. At the end of that time the reaction mass was cooled rapidly and the formed salts were acidulated with dilute hydrochloric acid. An oil layer formed upon acidulation.

The oil layer which formed seemed to be nearly pure sebacic acid mixed with a small amount of an unidentified oil. The mixture was extracted with generous portions of boiling water. The water solution was cooled, crystallized and then filtered to remove the crystals. The acid separated had a melting point of 130° C. and had an acid number of 552. The material was pure white and was an excellent grade of sebacic acid.

*Example 5*

600 parts of sulfonated oleic acid were slowly charged to 500 parts of molten caustic which had been heated to 360° C. under an atmosphere of nitrogen. The reaction was held under an atmosphere of the nitrogen during the entire reaction.

The addition of the sulfonated oleic acid required two hours. At the end of that time the reaction mass was rapidly cooled and diluted with water and acidulated with 25% sulfuric acid. An oil layer separated. The oil layer was vacuum distilled and a monobasic acid was recovered in the distillate, which appeared to be a mixture of pelargonic acid, caprylic acid and caproic acid, and possibly other monobasic acids. The oil layer was extracted with generous quantities of boiling water and upon cooling crystals formed. The crystals were filtered and appeared to be a mixture of dibasic acids in the range $C_6$ to $C_{11}$. The acid number was 580.

It is not desired to be limited except as set forth in the following claims, the above description being by way of illustration only.

What is claimed is:

1. The process for the preparation of dibasic and monobasic acids from monohydroxy aliphatic acid compounds comprising maintaining caustic in a molten state at a temperature not in excess of about 475° C. and adding the selected monohydroxy aliphatic acid compound to the caustic gradually in small portions, said reaction being carried out in an atmosphere substantially free from oxygen, and acidulating the thus formed salts with a mineral acid.

2. The process for the preparation of nonane dicarboxylic acid, heptanoic acid and undecanoic acid from 12 hydroxy stearic acid, which comprises maintaining caustic in a molten state at a temperature not in excess of about 475° C. and adding the 12 hydroxy stearic acid to the caustic gradually in small portions, said reaction being carried out in an atmosphere substantially free from oxygen, cooling the reaction mass and acidulating the thus cooled mass with a mineral acid.

3. The process for the preparation of heptanoic acid and undecylenic acid from ricinoleic acid, which comprises maintaining caustic in a molten state at a temperature not in excess of about 475° C. and adding the ricinoleic acid to the caustic gradually in small portions, said reaction being carried out in an atmosphere substantially free from oxygen, cooling the reaction mass and acidulating the thus cooled mass with a mineral acid.

4. The process for the preparation of pelargonic acid and brassylic acid from 13 chloro behenic acid, which comprises maintaining caustic in a molten state at a temperature not in excess of about 475° C. and adding the 13 chloro behenic acid to the caustic gradually in small portions, said reaction being carried out in an atmosphere substantially free from oxygen, cooling the reaction mass and acidulating the thus cooled mass with a mineral acid.

5. The process for the preparation of nonane dicarboxylic acid, heptanoic acid and undecanoic acid from 12 hydroxy stearic acid, which comprises maintaining sodium hydroxide in a molten state at a temperature not in excess of about 475° C. and adding the 12 hydroxy stearic acid to the sodium hydroxide gradually in small portions, said reaction being carried out in an atmosphere substantially free from oxygen, cooling the reaction mass and acidulating the thus cooled mass with a mineral acid.

6. The process for the preparation of heptanoic acid and undecylenic acid from ricinoleic acid, which comprises maintaining sodium hydroxide in a molten state at a temperature not in excess of about 475° C. and adding the ricinoleic acid to the sodium hydroxide gradually in small portions, said reaction being carried out in an atmosphere substantially free from oxygen, cooling the reaction mass and acidulating the thus cooled mass with a mineral acid.

7. The process for the preparation of pelargonic acid and brassylic acid from 13 chloro behenic acid, which comprises maintaining potassium hydroxide in a molten state at a temperature not in excess of about 475° C. and adding the 13 chloro behenic acid to the potassium hydroxide gradually in small portions, said reaction being carried out in an atmosphere substantially free from oxygen, cooling the reaction mass and acidulating the thus cooled mass with a mineral acid.

References Cited in the file of this patent

UNITED STATES PATENTS

| | | |
|---|---|---|
| 2,217,515 | Houpt | Oct. 8, 1940 |
| 2,341,239 | Percy et al. | Feb. 8, 1944 |
| 2,580,931 | Lane | Jan. 1, 1952 |
| 2,614,122 | Mikeska | Oct. 14, 1952 |
| 2,625,558 | Logan | Jan. 13, 1953 |